United States Patent Office

2,740,763
Patented Apr. 3, 1956

2,740,763

FIBER-FORMING SOLUTION OF ACRYLONITRILE POLYMER AND REDUCTIVELY AMINATED POLYMER

George E. Ham, Dayton, Ohio, assignor to The Chemstrand Corporation, Decatur, Ala., a corporation of Delaware No Drawing. Application March 7, 1952,
Serial No. 275,460

10 Claims. (Cl. 260—32.6)

This invention relates to polymeric compositions having fiber-forming properties. More particularly the invention is concerned with the preparation of polymeric acrylonitrile compositions which are dye-receptive and capable of being converted readily into dyeable general purpose fibers, as well as other dyeable shaped articles, such as films, foils, rods, filaments, strands, yarns and the like.

It is well-known that polyacrylonitrile, and various copolymers of acrylonitrile and other olefinic monomers, can be spun into synthetic fibers having unusual physical properties. Because polyacrylonitrile and the many copolymers of acrylonitrile are almost inert chemicals, conventional dyeing procedures are not useful in dyeing them. Many copolymers of acrylonitrile have been prepared using as the comonomers, substances which impart dye affinity. Copolymers of this type are not always satisfactory because of the excessive cost of the dye-receptive comonomers, and because the introduction of such substances often depreciates the desirable fiber-forming characteristics of the copolymer.

The primary object of the present invention is to provide new acrylonitrile polymer compositions having chemical and physical properties of polyacrylonitrile. Another object of the invention is to provide a completely dye-receptive polymeric composition or one which can be made so by simply readily practicable procedures. Still another object of the invention is to provide a means for converting non dyeable acrylonitrile polymers into dye-receptive forms. A still further object of the invention is to provide new general purpose synthetic fibers. Other objects and advantages of the present invention will be apparent from the description thereof hereinafter.

In accordance with the instant invention it has been found that polyacrylonitrile and other non-dyeable polymers of acrylonitrile, for example, the copolymers of over 80% acrylonitrile and up to 20% of other olefinic monomers such as vinyl acetate, styrene, alpha methyl styrene, methacrylonitrile, vinyl chloride, vinylidene chloride and the various alkyl acrylates, alkyl methacrylates, dialkyl fumarates, and dialkyl maleates wherein the akyl groups have up to 4 carbon atoms, may be readily converted into dyeable polymers. This is achieved by blending the non-dyeable polymers with basic components for acrylonitrile fibers or polymers comprising polymeric compositions derived by the polymerization of various unsaturated ketones, said polymeric compositions having been reacted with ammonia and amines containing replaceable hydrogens. Among the various ketones which are suitable in the practice of the present invention are methyl vinyl ketone, isopropenyl methyl ketone, allyl methyl ketone, and vinyl pyruvate.

The proportions of the unsaturated ketone containing polymer employed in the blend will depend upon the degree of dye-receptivity desired, and upon the proportion of the ketone monomer in the blending polymer. In general it is desirable to have from 2 to 20% of the fiber-forming composition in the polymeric form of the ketone. Thus, if the blending polymer is 100% ketone polymer, from 2 to 20% will be required to develop suitable dye-receptivity. If a copolymer of the ketone and another monomer is used, proportionately more will be required to obtain the desired end result. Copolymers of more than 30% of the ketone monomers and up to 70% of another olefinic monomer may be employed. These other monomers may be acrylonitrile, methacrylonitrile, vinyl acetate, vinyl chloride, vinylidene chloride, styrene, alpha-methylstyrene, and the various alkyl acrylates, alkyl methacrylates, dialkyl fumarates, and the dialkyl maleates, wherein the alkyl radicals have up to 4 carbon atoms. Because copolymers of acrylonitrile have unusual solvent and chemical resistance the preferred blending polymer is one of substantial portions of acrylonitrile and sufficient of the ketone monomer to develop dye-receptivity in the portions to be blended with the fiber-forming acrylonitrile polymers. While various proportions of the monomers may be employed in the blending polymer, a very useful blending polymer is one of 50% acrylonitrile and 50% of the ketone, for example, methyl vinyl ketone. In general, blends or polymeric compositions containing from 50 to 98 parts or percent by weight of the non-dyeable polymer and from 2 to 50 parts or percent of the blending polymer or ketone containing polymer are satisfactory.

The base polymers are preferably prepared in an aqueous medium in the presence of a water-soluble peroxy catalyst and in the presence of an agent which maintains the polymer formed in a fine but granular dispersed condition. Suitable peroxy catalysts are the alkali metal persulfates and suitable dispersing agents are the alkali metal salts of sulfonated hydrocarbons. Polymerization may be conducted by batch procedures, by continuous procedures, or by combinations of these procedures. A preferred method of preparation involves a batch procedure wherein the desired monomers are mixed and charged gradually throughout the polymerization. Usually uniform polymers may be obtained by also charging the catalyst and emulsifier continuously or in increments throughout the course of the reaction. More uniform polymerization conditions may be achieved by operating at uniform temperatures, for example the reflux temperature of the medium, especially if the operation is so conducted as to provide a constant temperature at reflux.

If desired, the polymerization reaction may be conducted in the presence of a "redox" agent, for example, sulfur dioxide, sodium bisulfite, sodium thiosulfate, or other sulfur compounds in which the sulfur is present in an oxidizable condition. Other optional procedures may involve the use of regulators which serve as chain terminators to prevent the formation of very high molecular weight increments, agents of this type being t-dodecyl mercaptan, thioglycolic acid, and dithioglycidol.

Emulsion polymerization procedures, well-known in the art, are employed to prepare the blending polymer employing the "soaps" as inert wetting agents, or emulsion stabilizers. Such compounds include the water-soluble salts of fatty acids, such as sodium oleate and potassium stearate, mixtures of water-soluble fatty acid salts, such as common soaps prepared by the saponification of animal and vegetable oils, the "amino soaps," and any other of the wide variety of wetting agents, which are in general organic compounds containing both hydrophobic and hydrophilic radicals.

In order to convert the ketone polymers, or the fiber-forming blends containing an increment of the ketone polymer, it is necessary to react the same with a compound which will induce an amino nitrogen atom. Suitable reagents of this type are ammonia and the aliphatic primary and secondary amines.

In this manner a nitrogen atom is introduced into the molecule which will provide a nucleus for chemical reaction with conventional acid dyestuffs. Suitable amines for use in the development of dye-receptivity are methylamine, n-butylamine, ethylene diamine, ethanolamine, diethylamine, ethylisopropylamine, diethanolamine, dicyclohexylamine and hexamethylene tetramine. In addition, such compounds as morpholine, piperidine, and imidazole may be employed if desired.

The polymer may be treated with the various nitrogen compounds in granular solid state, in solution in a suitable solvent, and in the form of a spun fiber. If the polymer is in solid form, obviously only the surface will be reacted chemically, and if the polymer is treated in solid form before spinning, the activated surface may be substantially diluted when the polymer is dissolved and reformed into fibers. Accordingly, the most effective procedure involves chemical treatment in solution state. This modification may take place in the spinning solution from which the fibers will ultimately be prepared. Accordingly, the polymers are each dissolved, separate or together in suitable solvents, for example, N,N-dimethylformamide, $\gamma$-butyrolactone, ethylene carbonate, or other conventional polyacrylonitrile solvents.

In the practice of the present invention the dyeable fiber-forming compositions are prepared by mixing the solid polymers in suitable conventional mechanical mixers, for example, Banbury mixers, roll mixers, or dough mixers. In general, it is desirable to add the solvents or plasticizers for the fiber-forming acrylonitrile polymers. The intimate mixing of the polymers or blended polymers with the reagent may induce the reaction of specifically all of the reactive groups. Less thorough mixing will induce the reaction of only a small proportion of the reactive groups with the amine, for example, from 5 to 50%. Under such conditions it will be necessary to add more of the ketone polymers in order to develop the desirable extent of dye-receptivity. Thus the manner of mixing of the blending mixtures must be considered in selecting the proper proportions of polymers.

The new blended compositions of the instant invention may be fabricated into synthetic fibers by the conventional wet or dry spinning procedures. After stretching the fibers to develop the necessary orientation therein and the incident tensile strength, and thereafter shrinking the fibers to improve their thermal resistance, valuable general purpose fibers are obtained.

Further details of the present invention are set forth with respect to the following examples which are merely intended in an illustrative sense and the invention is not to be limited thereby but only insofar as the same may be limited by the appended claims.

*Example I*

A monomer mixture of 50 gms. of methyl vinyl ketone and 50 gms. of acrylonitrile was added over a period of 1¼ hours to a solution containing 2 gms. of Ivory soap dissolved in 250 gms. of distilled water at 75° C. under a reflux condenser with mechanical stirring. A solution of 0.5 gm. potassium persulfate in 50 gms. of water was added in six increments throughout the monomer addition. The emulsion thus formed was steam-distilled, cooled and then coagulated by the addition of an equal volume of ethanol and 1 gm. of alum dissolved in 100 gms. of water. The coagulated emulsion was then filtered, washed with alcohol and water, and dried. A total of 76.8 gms. of a copolymer of 47.9% acrylonitrile and 52.1% methyl vinyl ketone (specific viscosity in 0.1% dimethylformamide of 0.098) was obtained.

*Example II*

The copolymer obtained in Example I was dissolved in dimethylformamide to produce a 9.7% solution (by weight). Ammonia gas was then passed through the solution for 1.3 hours at a temperature of 30° C. At the end of this time the solution was allowed to stand for 20 minutes, then the unreacted ammonia was displaced from the solution by the introduction of nitrogen for one hour. There was a 32.6% conversion to amine.

A solution of a copolymer of 97% acrylonitrile and 3% vinyl acetate in dimethylformamide was mixed with the aminated copolymer solution to give an overall concentration of approximately 3% aminated unit and a final polymer concentration in the solution of 13% by weight. The resultant light amber-colored solution was spun into a mixture of 60% dimethylacetamide and 40% water through a 30-hole (0.005") spinneret. The fiber was continuously washed in hot water, dried on steam-heated rolls and steam-stretched 450%. The fiber so produced possessed a tenacity of 1.8 gm./denier, an elongation of 5 to 7%, and a relative knot strength of 39.4%. The fiber was then dyed as skeins in Wool Fast Scarlet G Supra dyebaths of 2% and 10% concentrations (based on the fiber weight), each bath containing 10% sulfuric acid (based on the fiber weight). In each case the dyebath to fiber ratio was 45/1. Complete dyebath exhaustion occurred in both cases with the fibers being dyed deep scarlet shades after two hours at boiling. The dry cleaning fastness and wash fastness of the samples were excellent.

*Example III*

The procedure of Example II was duplicated with the exception that the blend of the copolymer of 97% acrylonitrile and 3% vinyl acetate and the aminated copolymer contained 2% of the amino residue. The fiber after being stretched 385% possessed a tenacity of 3 gms./denier, an elongation of 5 to 7%, a knot strength of 1.7 gms./denier, and a knot elongation of 1 to 4%. The light-colored fiber also possessed a relative knot strength of 56.2%. Skeins of the fiber were dyed at 2 and 10% Wool Fast Scarlet concentrations for two hours at boiling. At both concentrations excellent dye pick-up occurred to yield deep shades of scarlet. The dyed fibers possessed good wash fastness and dry cleaning fastness. The dry shrinkage of the fiber was 5% at 130° C., 10% at 165° C., and 15% at 200° C.

*Example IV*

The procedure of Example II was again duplicated with the exception that the blend of the 97% acrylonitrile-3% vinyl acetate copolymer and the aminated copolymer contained 1% of the amino residue. The fiber was stretched 259% and dyed as in Example II. An improvement in dyeability over a sample of 97% acrylonitrile-3% vinyl acetate copolymer fiber was noted.

*Example V*

Employing the procedure outlined in Example I copolymers are prepared comprising 69% by weight of acrylonitrile and 31% by weight of isopropenyl methyl ketone, allyl methyl ketone, and vinyl pyruvate. The reaction rates in copolymerization decrease with increasing ketone concentrations. These copolymers are allowed to react with ammonia as outlined in Example II. The aminated products are each blended with a copolymer of 97% by weight acrylonitrile and 3% vinyl acetate and then spun as described in Example II. Fibers of excellent strength and dyeability properties are obtained.

*Example VI*

A copolymer of 50% methyl vinyl ketone and 50% styrene (by weight) was produced in a conversion of 94.8% at 90° C. using the method of Example I (specific viscosity in 0.1% dimethylformamide of 0.064). A 10% solution of this copolymer in N,H-dimethylacetamide was saturated with ammonia gas for ½ hour at room temperature and the excess ammonia was removed by displacement with nitrogen. The product was 26.6% aminated. A polymer blend of 80% of a copolymer of 97% acrylonitrile and 3% vinyl acetate and 20% of the aminated copolymer of 50% styrene and 50% methyl vinyl ketone was spun as described in Example II. Fibers of good tenacity (2.19 gms./denier) and dyeability were obtained. In addition, the fibers were only slightly discolored on heating for ½ hour at 180° C.

It is to be understood that changes and variations may be made without departing from the spirit and scope of the invention as defined in the appended claims.

I claim:

1. A dyeable fiber-forming composition comprising a clear homogeneous solution of a blend of 50 to 98 percent by weight of (A) a polymer of at least 80 percent by weight of acrylonitrile and up to 20 percent of another mono-olefinic monomer copolymerizable therewith and from 2 to 50 percent by weight of (B) a reductively aminated copolymer of at least 30 percent by weight of a substance selected from the group consisting of methyl vinyl ketone, isopropenyl methyl ketone, allyl methyl ketone and vinyl pyruvate, and up to 70 percent of another mono-olefinic monomer copolymerizable therewith, dissolved in a solvent selected from the group consisting of N,N - dimethylformamide and N,N - dimethylacetamide, said copolymer (B) having been aminated by reacting it with a compound selected from the group consisting of ammonia and primary and secondary aliphatic amines.

2. A dyeable fiber-forming compostion as defined in claim 1 wherein the (B) copolymer is reacted with ammonia.

3. A dyeable fiber-forming composition as defined in claim 1 wherein the (B) copolymer is reacted with methylamine.

4. A dyeable fiber-forming composition as defined in claim 1 wherein the (B) copolymer is reacted with n-butylamine.

5. A dyeable fiber-forming composition as defined in claim 1 wherein the (B) copolymer is reacted with diethanolamine.

6. A dyeable fiber-forming composition as defined in claim 1 wherein the (B) copolymer is reacted with diethylamine.

7. A dyeable fiber-forming composition as defined in claim 1 wherein copolymer (B) contains methyl vinyl ketone.

8. A dyeable fiber-forming composition as defined in claim 1 wherein copolymer (B) contains isopropenyl methyl ketone.

9. A dyeable fiber-forming composition as defined in claim 1 wherein copolymer (B) contains allyl methyl ketone.

10. A dyeable fiber-forming composition as defined in claim 1 wherein copolymer (B) contains vinyl pyruvate.

References Cited in the file of this patent

UNITED STATES PATENTS

| | | |
|---|---|---|
| 2,122,707 | Balthis | July 5, 1938 |
| 2,495,255 | Hoehn | Jan. 24, 1950 |
| 2,527,863 | Webb | Oct. 31, 1950 |
| 2,589,055 | Coover et al. | Mar. 11, 1952 |
| 2,636,873 | Graham | Apr. 28, 1953 |